United States Patent [19]

Sellstrom et al.

[11] Patent Number: 4,578,412

[45] Date of Patent: Mar. 25, 1986

[54] EXTENDED AMINE CURING AGENTS [AND EPOXY RESINS CURED THEREWITH]

[75] Inventors: Kathy B. Sellstrom; Harold G. Waddill, both of Austin, Tex.

[73] Assignee: Texaco Inc., White Plains, N.Y.

[21] Appl. No.: 710,263

[22] Filed: Mar. 11, 1985

Related U.S. Application Data

[62] Division of Ser. No. 510,848, Jul. 5, 1983, Pat. No. 4,552,933.

[51] Int. Cl.$^4$ ............................................. C08L 75/04
[52] U.S. Cl. .................... 524/243; 521/49.5; 524/590; 525/453; 525/454; 525/456
[58] Field of Search .............. 525/453, 456, 504; 524/590, 243; 521/49.5

[56] References Cited

U.S. PATENT DOCUMENTS

| | | | |
|---|---|---|---|
| 3,117,940 | 1/1964 | McElroy | 260/2.3 |
| 3,300,417 | 1/1967 | McElroy | 260/2.3 |
| 3,632,530 | 1/1972 | Kinoshita | 260/2.3 |
| 3,847,726 | 11/1974 | Becker et al. | 161/186 |
| 4,000,214 | 12/1976 | Lum et al. | 260/835 |
| 4,101,497 | 7/1978 | Charves et al. | 260/31.2 N |
| 4,110,266 | 8/1978 | Sheratte | 260/2.3 |
| 4,139,524 | 2/1979 | Waddill | 528/109 |
| 4,162,358 | 7/1979 | Marquis et al. | 528/120 |
| 4,243,760 | 1/1981 | McDaniel et al. | 521/176 |
| 4,254,069 | 3/1981 | Dominguez et al. | 264/51 |
| 4,267,078 | 5/1981 | Lidy et al. | 260/2.3 |
| 4,273,884 | 6/1981 | Dominguez | 521/114 |
| 4,273,885 | 6/1981 | Dominguez et al. | 521/115 |
| 4,297,444 | 10/1981 | Dominguez et al. | 521/160 |
| 4,301,110 | 11/1981 | Cuscurida et al. | 264/328.14 |
| 4,309,532 | 1/1982 | Cuscurida et al. | 536/4 |
| 4,350,778 | 9/1982 | Dominguez et al. | 521/118 |
| 4,358,547 | 11/1982 | Cuscurida et al. | 521/126 |
| 4,359,540 | 11/1982 | McEntire et al. | 521/129 |
| 4,362,824 | 12/1982 | Dominguez et al. | 521/118 |

FOREIGN PATENT DOCUMENTS 2062660A 5/1981 United Kingdom .
1595431 8/1981 United Kingdom .

OTHER PUBLICATIONS

Handbook of Epoxy Resins, Lee & Neville, McGraw-Hill Book Co., 1967, "Jeffamine ® Polyoxypropylamines", ©1978, Jefferson Chemical Co.
Polyurethane Chemistry & Technology, vol. I & II, Saunders & Frish, Interscriver Publishers, 1962 & 1964.
Reaction Injection Molding, Becker, Van Nostrand Reishold Publishers.
RIM Urethanes, Lloyd, Industrial Research & Development, 1982.
The Reclamation of Flexible Polyurethane Foam, Salloum & Duff, Polym.-Plast. Technol. Eng., 19(1), 1–20 (1982).

Primary Examiner—Theodore E. Pertilla
Attorney, Agent, or Firm—Jack H. Park; Kenneth R. Priem

[57] ABSTRACT

Extended 1,2-epoxy-interactive polyamine curing compositions and a method for preparing such curing compositions from a 1,2-epoxy-interactive polyamine and a cured normally solid elastomeric polyurethane wherein the 1,2-epoxy-interactive curing agent is extended by forming a solution of the cured polyurethane elastomer in the 1,2-epoxy-interactive polyamine by (a) adding comminuted cured polyurethane elastomer particles to the polyamine, (b) adding a polar organic solvent solution of cured polyurethane elastomer to the polyamine, followed by removal of the polar organic solvent or (c) adding a phenol and formaldehyde to a solution of the cured polyurethane elastomer in the 1,2-epoxy-interactive polyamine to convert the polyamine to the corresponding Mannich condensate.

22 Claims, No Drawings

EXTENDED AMINE CURING AGENTS [AND EPOXY RESINS CURED THEREWITH]

This is a division, of application Ser. No. 06/510,848, filed July 5, 1983, now U.S. Pat. No. 4,552,933 issued 11/12/85.

BACKGROUND OF THE INVENTION

1. Technical Field of the Invention

This invention relates to curing agents for epoxy resins and more particularly to amines of the type heretofore known for use as curing agents for epoxy resins extended, in accordance with the present invention, by the incorporation thereinto of a solid elastomeric polyurethane. The solid elastomeric polyurethane is derived from an essentially difunctional aromatic diisocyanate, a high molecular weight isocyanate reactive polyether and a difunctional cross linking agent such as a diol or a diamine. The resulting composition is used to cure epoxy resins of the type heretofore known in the art.

2. Prior Art

It is known to use amines such as aliphatic or aromatic amines for the curing of epoxy resins as shown, for example in Waddill U.S. Pat. No. 4,139,524 and Marquis et al. U.S. Pat. No. 4,162,358. See also, the textbook "Handbook of Epoxy Resins" by H. Lee and K. Neville, McGraw Hill Book Co., 1967. There is significant technical literature on this subject as illustrated, for example by a technical brochure entitled "Jeffamine ® Polyoxypropyleneamines", Copyright 1978 by Jefferson Chemical Company, Inc. Becker et al. U.S. Pat. No. 3,847,726 discloses sheet metal laminates wherein the binder is an epoxide formed by curing an epoxy resin with a multi-component curing mixture, one component of which is a Mannich Condensate of polyoxypropylene amine, phenol and formaldehyde.

An extensive body of technical knowledge has arisen relating to the preparation of essentially solid polyurethane elastomers. See, for example, Vols. I and II of "Polyurethane Chemistry and Technology" by James H. Saunders and Kent C. Frish, Interscience Publishers, 1962 and 1964. One such group of elastomers is frequently referred to as RIM polyurethanes. This is an art-recognized term because RIM in an acronym for "Reaction Injection Molding", which is not a material, but rather, a process for molding polyurethanes. In the reaction injection molding (RIM) process two highly reactive streams of chemicals are brought together under high pressure (i.e., 2000 psi) in a small mixing chamber where the streams are impingement mixed by being sprayed directly into each other. The mixed material flows immediately into a warm mold where the chemical reaction is completed and the part is cured. The resultant elastomeric polyurethane will contain small pores and voids so that it is not, technically speaking, a voidless solid material. For example it can be calculated that the theoretical density for a polyurethane elastomer should be about 70 pounds per cubic foot. Normally, RIM elastomers based upon polyurethanes will have a density in the order of magnitude of about 60 pounds per cubic foot. The RIM process and the raw materials used therein are described in greater detail in the text, "Reaction Injection Molding" edited by Walter E. Becker, Van Nostrand Reinhold publishers, 1979.

In reaction injection molding, one of the two streams referred to above is the essentially difunctional aromatic diisocyanate stream.

The other stream is a stream containing a high molecular weight isocyanate reactive polyether based on propylene oxide, a cross linker such as a diol or a diamine and other conventional additives.

A representative list of U.S. patents directed to the preparation of RIM-polyurethanes includes, for example McDaniel et al. U.S. Pat. No. 4,243,760, Dominguez et al. U.S. Pat. No. 4,254,069, Dominguez U.S. Pat. No. 4,273,884, Dominguez et al. U.S. Pat. No. 4,273,885, Gilbert et al. U.S. Pat. No. 4,297,444, Cuscurida et al. U.S. Pat. No. 4,301,110, Cuscurida et al. U.S. Pat. No. 4,309,532, Dominguez et al. U.S. Pat. No. 4,350,778, and McEntire et al. U.S. Pat. No. 4,359,540. Also, Cuscurida et al. U.S. Pat. No. 4,358,547 and Dominguez et al. U.S. Pat. No. 4,362,824.

Solid elastomeric polyurethanes such as RIM polyurethanes are normally used as utilitarian articles such as body parts for automobiles, etc. The resultant scrap and defective moldings present a serious disposal problem. For example an article "The Reclamation of Flexible Polyurethane Foam" found in the Polymer-Plas. Technol. Eng., 19(1), 1–20 (1982), discloses various techniques that have been conceived insofar as the reclamation of highly porous, low density flexible polyurethane foam is concerned. Reclamation of high density polyurethane elastomers presents special problems because of the strength and durability of the materials involved.

Among the techniques for reclamation mentioned in this article is the use of a glycol or an amine as a solvent. As another example, in Lidy et al. U.S. Pat. No. 4,267,078, a process for disposing of scrap polyurethane is disclosed which involves comminuting the polyurethane and reacting it with an alkylene oxide to form a product that can be used to form additional foamed polyurethane. British specification No. 1,595,431 discloses a method wherein a polyurethane is comminuted, melted and then molded into elastomeric polyurethane products such as shoe soles. U.K. patent application No. 2,062,660A is directed to a reclaiming method wherein the polyurethane is heated in the presence of a compound capable of generating ammonia gas on decomposition in order to provide a degradation product.

SUMMARY OF THE INVENTION

In one aspect the present invention is directed to modified (i.e., extended) amine curing agents which are prepared by dissolving a solid elastomeric polyurethane such as a RIM polyurethane in an amine of the type used for curing epoxy resins. The RIM polyurethane can be incorporated into the amine by comminuting the RIM polyurethane and adding this to the amine at an elevated temperature such as a temperature within the range of about 100° to about 200° C.

In an alternate procedure that is particularly useful when the elastomeric polyurethane is not more than sparingly soluble in the amine, the RIM polyurethane is dissolved in an organic solvent at a temperature in the range of about 100° to about 200° C. The resultant solution is mixed with the amine and then the solvent is stripped from the resultant mixture by any conventional means, such as vacuum distillation, to provide the desired extended amine curing agent.

When the solution of the RIM polyurethane in the amine is cooled, it sometimes happens that phase separation into a plurality of liquid phases will occur. This is a function of the amine used as a solvent and also of the concentration of RIM polyurethane in the amine solution. Phase separation is not detrimental to the overall utility of the extended amine curative since the amine curing agent and epoxy starting material are normally mixed with agitation at the time of use. However, if phase separation is considered bothersome, it can be eliminated in most instances by using the amine as a solvent for the RIM polyurethane and then making a Mannich condensate with the amine urethane solution.

In another aspect the present invention is directed to the use of extended amine curing agents for curing epoxy resins.

DETAILED DESCRIPTION

The principal components of the compositions and methods of the present invention are the epoxy resin, the amine curing agent and the solid elastomeric polyurethane that is dissolved in the amine.

EPOXIDE STARTING MATERIALS

Generally the vicinal epoxide compositions that can be cured using the curing agents of this invention are organic materials having an average of more than one reactive 1,2-epoxide group. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, halogenated phenyl groups and the like.

The most widely used epoxy resins are diglycidyl ethers of bisphenol A:

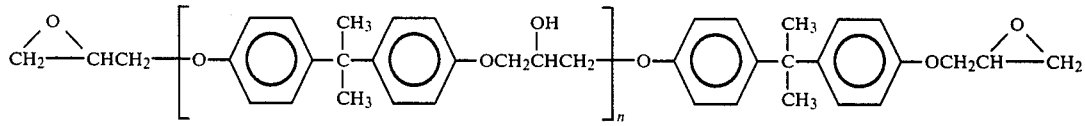

where n represents a number from 0 to 5.

However, these epoxides are representative of the broader class of epoxide compounds that are useful in making epoxy resins.

A widely used class of polyepoxides that can be cured according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydihenylmethane, 4,4'-dihydroxydiphenylbutylphenylmethane, 2,2'-dihydroxydiphenylditolylmethane, 4,4'-dihydroxydiphenyltolylmethyl-methane and the like. Other polyhydric phenols which may also be co-reacted with an epihalohydrin to provide these epoxy polyethers are such compounds as resorcinol, hydroquinone, substituted hydroquinones, e.g., tert-butylhydroquinone, and the like.

Among the polyhydric alcohols that can be co-reacted with an epihalohydrin to provide the resinous epoxy polyethers are such compounds as ethylene glycol, propylene glycol, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides that can be cured by means of the above-described curing agents includes the epoxy novolac resins obtained by reacting, preferably, in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K. "Handbook of Epoxy Resins".

It will be appreciated by those skilled in the art that the polyepoxide compositions that can be cured according to the practice of the present invention are not limited to the above described polyepoxides, but that these polyepoxides are to be considered merely as being representative of the class of polyepoxides as a whole.

The amount of curing agent that is employed in curing polyepoxide compositions will depend on the amine equivalent weight of the curing agent employed. The total number of equivalents of amine group is preferably from about 0.8 to about 1.2 times the number of epoxide equivalents present in the curable epoxy resin composition with a stoichiometric amount being most preferred.

Various conventionally employed additives can be admixed with these polyepoxide-containing compositions prior to final cure. For example, in certain instances it may be desired to add minor amounts of other co-catalysts, or hardners, along with the curing agent system herein described. Conventional pigments, dyes, fillers, flame retarding agents and other compatible natural and synthetic resins can also be added. Furthermore, known solvents for the polyepoxide materials such as acetone, methyl ethyl ketone, toluene, benzene, xylene, dioxane, methyl isobutyl ketone, dimethylformamide, ethylene glycol monoethyl ether acetate, and the like, can be used if desired, or where necessary.

THE AMINE CURING AGENT

A curable epoxy resin composition is prepared by admixing one or more epoxides, as described above, with an epoxy-interactive polyamine curing agent. The ratio of active amino hydrogens to epoxy groups in the admixture may suitably be in the range of about 0.5–2:1 and, preferably, in the range of about 0.8–1.5:1.

Suitable polyamine curing agents are those that contain more than two active hydrogens per molecule.

Examples of such curing agents are alkylene polyamines represented by the formula:

$$NH_2C_2H_4(NHC_2H_4)_nX$$

where X is —OH or —NH$_2$ and where n has the value of 0 to about 5. When X is —NH$_2$, such alkylene polyamines include ethylene diamine, diethylene triamine, triethylene tetramine, tetraethylene pentamine, pentaethylene hexamine, and the like.

These polyamines provide admixtures having low viscosity and provide epoxy resin compositions that generally have good chemical resistance. When X is —OH, representative amines include $$H_2NC_2H_4NHC_2H_4NHCH_2CH_2OH,$$

$$H_2NCH_2CH_2NHC_2H_4NHC_2H_4NHC_2H_4NHCH_2\text{-}CH_2OH$$

Long-chain polyamine adducts such as trimethyl-1,6-hexanediamine may also be used to impart color stability.

Thus, broadly speaking, aromatic, alicyclic, heterocyclic, and aliphatic amines may be used as well as more complex amine compounds such as polyether polyamines, etc. Other examples include N-aminoethylpiperazine, m-phenylenediamine, 2,4- or 2,6-toluenediamine, etc.

A particularly useful class of amines are amines derived from polyoxypropylene diols and triols.

Preferably, we employ polyoxypropylene diamines of the formula:

$$H_2NCH(CH_3)CH_2[OCH_2CH_2CH(CH_3)]_xNH_2$$

wherein x is an integer of from about 2 to about 40, and polyoxypropylene triamines of the formula:

$$\begin{array}{c} CH_2\text{---}(OCH_2CH(CH_3))_{\overline{x}}NH_2 \\ | \\ CH_3CH_2\text{---}C\text{---}CH_2\text{---}(OCH_2CH(CH_3))_{\overline{y}}NH_2 \\ | \\ CH_2\text{---}(OCH_2CH(CH_3))_{\overline{z}}NH_2 \end{array}$$

wherein x, y and z represent integers in the range of about 1 to 15, and the sum of x, y and z is from about 3 to about 50. The most preferred polyoxypropylene diamines of the formula have average molecular weights between about 230, where x is an average of 2.6 to about 2,000 where x is an average of about 33.1. Preferred polyoxypropylene triamines of the above formula have average molecular weights between about 190 to about 3,000. These polyoxypropylene di- and triamines are readily available commercially in a wide variety of molecular weight ranges.

Also useful are amines having the formula:

$$H_2NCH(CH_3)CH_2[OCH(CH_3)CH_2]_x\text{---}[OCH_2CH_2]_y\text{---}[OCH_2CH(CH_3)]_zNH_2$$

where x+z equals 2 to 10 and y is a number having a value from 1 to 50.

THE ELASTOMERIC (RIM) POLYURETHANE

As has been heretofore indicated, the elastomeric polyurethanes to be used as extenders in accordance with the present invention are prepared by the reaction of an essentially difunctional aromatic diisocyanate with a high molecular weight isocyanate reactive polyether based on propylene oxide.

The polyethers useful in making the polyurethane elastomers include polyether polyols, polyester diols, triols, tetrols, polyetherpolyamines etc., having an equivalent weight of at least 500, and preferably at least 1000 up to about 3000 or more. The polyether polyols based on trihydric initiators of about 4000 molecular weight and above are especially preferred. The polyethers may be prepared from lower alkylene oxides such as ethylene oxide, propylene oxide, butylene oxide or mixtures of propylene oxide, butylene oxide and/or ethylene oxide. Propylene oxide is at least about 60 wt percent of the polyol component. When butylene oxide is used, propylene oxide may be omitted, if desired. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Hydroxyl terminated quasi-prepolymers of polyols and isocyanates are also useful in this invention.

The polyethers and polyesters that may be used are described in greater detail in the textbook edited by W. E. Becker, mentioned above. The use of polyether polyamines is disclosed, for example, in copending Dominquez et al. U.S. patent application Ser. No. 371,161 filed Apr. 3, 1982 now U.S. Pat. No. 4,396,729.

The chain-extenders are preferably difunctional and include diols, amino alcohols, diamines or mixtures thereof, such as 1,4-butanediol, ethylene glycol, 1,4-cyclohexane diol, bis-hydroxyethylhydroquinone, etc. Amide or ester containing diols or amino alcohols, aromatic diamines and aliphatic amines are also suitable as chain-extenders.

A wide variety of aromatic polyisocyanates may be used. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other useful aromatic polyisocyanates are methylene-bridged polyphenyl polyisocyanate mixtures which have a functionality of from about 2 to about 4. See, for example, U.S. Pat. Nos. 2,683,730; 2,950,263; 3,012,008; 3,344,162 and 3,362,979.

The preferred aromatic polyisocyanate is methylene bis(4-phenylisocyanate) or MDI. Pure MDI, quasi-prepolymers of MDI, modified MDI, etc. and other materials of this type may be used to prepare suitable RIM elastomers. Since pure MDI is solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. Uretonimine modified pure MDI is included also. This product is made by heating pure distilled MDI in the presence of a catalyst. The liquid product is a mixture of pure MDI and modified MDI:

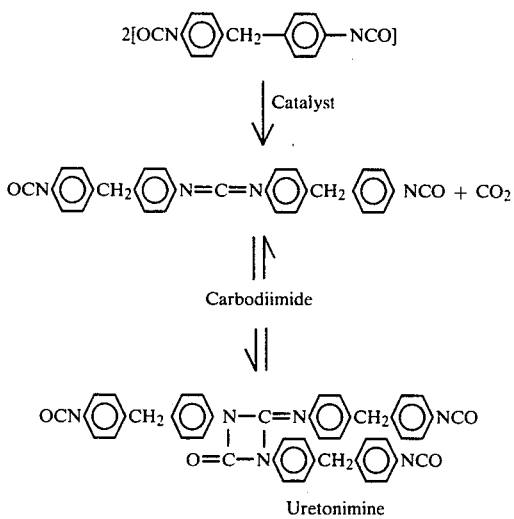

Examples of commercial materials of this type are Upjohn's ISONATE® 125M (pure MDI) and ISONATE® 143L ("liquid" MDI). Preferably the amount of isocyanates used is the stoichiometric amount based on all the ingredients in the formulation.

Tertiary amines that can be used as catalysts include trialkylamines (e.g., trimethylamine, triethylamine), heterocyclic amines such as N-alkylmorpholines (e.g., N-methylmorpholine, N-ethylmorpholine), dimethyldiaminodiethylether, 1,4-dimethylpiperazine, triethylenediamine, etc., aliphatic polyamines such as N,N,N',N'-tetramethyl-1,3-butanediamine, etc.

It has been found that an improvement in processing characteristics of reaction injection molded (RIM) polyurethanes may be had by employment of a combination catalyst. A combination catalyst comprising a weak tertiary amine catalyst, a fast gelation organo tin catalyst and a delayed action gelation organo tin catalyst can also be used. For example, the fast gelation tin catalyst may be dibutyltin dilaurate, the delayed action gelation tin catalyst may be an alkyltin mercaptide such as a commercial product known as FOMREZ®UL-29. The weak tertiary amine may be methyldiethanolamine.

The RIM formulation may include other recognized ingredients such as additional cross-linkers, catalysts, extenders, blowing agents, foam stabilizers, dyes, chipped or milled glass fibers, chopped or milled carbon fibers and/or other mineral fibers, etc.

PREPARATION OF THE EXTENDED AMINE CURING AGENT

In accordance with the present invention, a polyurethane elastomer such as a RIM elastomer is comminuted and then dissolved in an amine curing agent of the type described herein. This is a straight-forward operation that can be performed in any suitable reaction vessel such as an autoclave provided with agitation means and means for heating the contents of the clave. The desired quantity of the amine curing agent is placed in the vessel and brought to a desired temperature with agitation normally within the range of about 100° to 200° C., preferably under an inert atmosphere. The temperature to be utilized will be, in part, a function of the temperature at which the urethane elastomer will dissolve. It has been found that this normally will occur at a temperature within the range of about 140° to about 170° C.

In some situations the resultant solution may tend to separate into two or more layers. This does not present a problem so long as the layers are well mixed before the extended amine is added to the epoxy, as hereafter described. To the contrary, solutions that tend to layer frequently improve the adhesion properties of the resultant epoxy.

In accordance with a modified procedure that is particularly useful when the elastomeric polyurethane is not soluble in the amine to be used as a curing agent or is only sparingly soluble, the comminuted elastomeric polyurethane is first dissolved in a polar organic solvent in which it is soluble such as dimethylformamide, glycol ethers such as ethylene glycol, diethylether, ethylene glycol dibutylether, ethylene glycol acetates such as ethylene glycol diacetate, etc. This step is performed as described above with respect to the amine, in a suitable reaction vessel such as an autoclave and an appropriate temperature within the range of 100° to 200° C. After the solution is formed, it is mixed with the desired amine curing agent and the solvent is then removed from the resultant mixture, for example, by vacuum distillation.

In situations where the use of the amine curing in the form of a Mannich condensate is desired, the procedures normally used in the preparation of Mannich condensates are employed (see, for example, Becker U.S. Pat. No. 3,847,726). A phenol, preferably phenol, is used as the source of the active hydrogen for the reaction and is preferably used in an equimolar ratio to the formaldehyde. However, the mol ratio of the amine to the formaldehyde may be varied, as desired. Ratios of 1 to 4 mols of amine per mol of formaldehyde have been used with success. Other phenols that can be used include, for example, alkylphenols such as nonylphenol, dialkylphenols, etc.

It is within the scope of the present invention to use known extenders for amine-based epoxy using systems, for example, synthetic rubber such as a rubbery liquid amine-terminated copolymer of acrylonitrile and butadiene.

SPECIFIC EXAMPLES

EXAMPLE 1

A series of extended amine curing agents were prepared by dissolving a comminuted RIM polyurethane in the desired amine in a resin kettle at an appropriate temperature with agitation and heating.

The particular elastomeric polyurethane used in this series of experiments was one which had been prepared by reacting a polyisopropylene polyetherpolyol having a functionality of 3 and a molecular weight of about 6500 with ethylene glycol in a liquid MDI-based isocyanate.

The amines that were used, the temperature of the solution and the amount of scrap incorporated are indicated in the following table.

TABLE 1

Amine.RIM Solutions Prepared

| Run # | Amine | Amount Scrap RIM added, wt % | Temp. required, °C. | Remarks |
|---|---|---|---|---|
| 5409-31 | JEFFAMINE D-230 | 16.7 | 170 | — |
| 5409-33 | JEFFAMINE D-230 | 30 | 170 | — |
| 5409-35 | JEFFAMINE D-230 | 20 | 170 | — |
| 5409-36 | JEFFAMINE D-230 | 40 | 170 | Two layers |
| 5409-38 | JEFFAMINE D-2000/D-400 (3/1 blend) | 20 | 220 | — |
| 5409-41 | N—aminoethylpiperazine | 30 | 150 | Two layers |
| 5409-45 | THANCAT ® DPA | 10 | 170 | — |
| 5409-46 | JEFFAMINE ED-900 | 20 | 170 | — |
| 5409-48 | Triethylenetetramine | 20 | 140 | Two layers |
| 5409-49 | Isophoronediamine | 20 | 150 | — |
| 5409-51 | JEFFAMINE T-403 | 30 | 175 | — |

JEFFAMINE D-230, D-400 and D-2000 are represented by the following structure:

| $H_2NCH(CH_3)CH_2[-OCH_2CH(CH_3)-]_xNH_2$ | |
|---|---|
| JEFFAMINE | x (approx.) |
| D-2000 | 33.1 |
| D-400 | 5.6 |
| D-230 | 2.6 |

JEFFAMINE T-403 has the following structure:

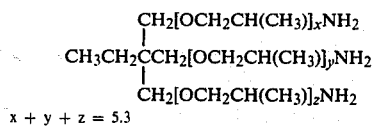

$x + y + z = 5.3$

THANCAT DPA is represented by the following structure:

$[HOCH(CH_3)CH_2]_2NCH_2CH(CH_3)N(CH_3)_2$

Amines such as JEFFAMINE-ED 900 may be generically represented by the formula:

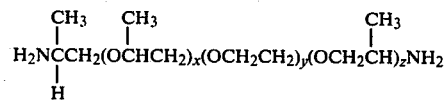

wherein x plus z equal about 3.5 and y equals about 13 to 46.

The physical properties of the resultant solutions were measured and the results are set forth in Table 2.

Thereafter, the extended amines were used to cure a representative epoxy resin with the results set forth in Table 3. In one set of experiments the epoxy resin was cured at ambient temperature (Table 3) and in another set of experiments the epoxy resin was cured at an elevated temperature. The results of the elevated temperature cure are set forth in Table 4.

TABLE 2

Typical Analyses of Amine.RIM Solutions

| Run No. | 5409-68A | 5409-31 | 5409-35 | 5409-33 | 5409-36 | 5409-68C | 5409-51 | 5465-18 | 5409-41 | 5465-28A | 5465-28B | 5465-28C | 5465-28D |
|---|---|---|---|---|---|---|---|---|---|---|---|---|---|
| Amine | D-230 | D-230 | D-230 | D-230 | D-230 | T-403 | T-403 | AEP | AEP | TETA | TETA | IPDA | IPDA |
| Wt % RIM | 0 | 16.7 | 20 | 30 | 40 | 0 | 30 | 0 | 30 | 0 | 20 | 0 | 20 |
| Total acetylatables, meq/g | 8.75 | 7.96 | 7.24 | 6.38 | 5.40 | 6.75 | 5.04 | 15.68 | 11.06 | 23.70 | 19.02 | 11.74 | 9.63 |
| Total amine, meq/g | 8.45 | 6.74 | 6.40 | 5.22 | 4.04 | 6.45 | 3.87 | 23.50 | 16.15 | 24.44 | 19.63 | 11.89 | 8.92 |
| 1° Amine, meq/g | 8.30 | 6.58 | 6.19 | 5.03 | 3.91 | 6.16 | 3.45 | 7.5 | 11.32 | 11.25 | 2.53 | 11.87 | 8.88 |
| 2° Amine, meq/g | — | — | — | — | — | — | — | — | — | 10.66 | 15.11 | 0.01 | 0.02 |
| 3° Amine, meq/g | — | — | — | — | — | — | — | — | — | 2.46 | 1.99 | 0.01 | 0.02 |
| Specific gravity, 20/20° C. | 0.9480 | 0.9912 | 0.9976 | 1.0262 | 1.0525 | 0.9812 | 1.0500 | 0.9879 | 1.0529 | 0.9853 | 1.0268 | 0.9261 | 0.9800 |
| Brookfield visc., cps, 25° C. | — | 62 | 97 | 455 | 4000 | — | 19400 | 20 | 672 | — | — | — | — |
| Water, wt % | 0.10 | 0.15 | 0.15 | 0.19 | 0.08 | 0.08 | 0.04 | 0.57 | 0.15 | 1.78 | 0.34 | 0.17 | 0.08 |

TABLE 3

Properties of Epoxy Resin Cured with Solutions of RIM Urethane in JEFFAMINE Polyetheramines (Ambient Curing)

| | 5409-68B | 5409-31B | 5409-35B | 5409-33B | 5409-36B | 5409-68D | 5409-51B |
|---|---|---|---|---|---|---|---|
| Formulation, pbw: | | | | | | | |
| Epoxy Resin (WPE 188) | 100 | 100 | 100 | 100 | 100 | 100 | 100 |
| JEFFAMINE ® D-230 | 26.4 | — | — | — | — | — | — |
| D-230.RIM (83.3/16.7) | — | 36 | — | — | — | — | — |
| D-230.RIM (80/20) | — | — | 37.6 | — | — | — | — |
| D-230.RIM (70/30) | — | — | — | 47 | — | — | — |
| D-230.RIM (60/40) | — | — | — | — | 54.7 | — | — |
| JEFFAMINE T-403 | — | — | — | — | — | 36.4 | — |
| T-403.RIM (70/30) | — | — | — | — | — | — | 62.5 |
| Accelerator 399 | 5 | 5 | 5 | 5 | 5 | 5 | 5 |
| Brookfield viscosity, cps, 25° C. | 850 | 1290 | 1790 | 3560 | — | 2200 | 14620 |

TABLE 3-continued

Properties of Epoxy Resin Cured with Solutions of
RIM Urethane in JEFFAMINE Polyetheramines (Ambient Curing)

|  | 5409-68B | 5409-31B | 5409-35B | 5409-33B | 5409-36B | 5409-68D | 5409-51B |
|---|---|---|---|---|---|---|---|
| (resin-curative mix) | | | | | | | |
| Gel time, min. (200 g mass) | 52.0 | 56.0 | 46.5 | 55.0 | — | 52.5 | ~75 |
| Peak exothermic temp., °C. | 189.5 | 166.0 | 172.2 | 137.6 | — | 160.2 | 63.8 |
| Time to peak temp., min. | 61.5 | 71.5 | 61.0 | 76.5 | — | 80.2 | 97.5 |
| Properties of cured ⅛" Castings[1] | | | | | | | |
| Shore D hardness, 0-10 sec | 90-89 | 80-78 | 78-77 | 77-75 | 75-74 | 90-88 | 76-75 |
| Ultimate elongation, % | 2.1 | 3 | 3.9 | 10 | 6.9 | 1.7 | 6.5 |
| Heat deflection temp., °C. | 46/48 | 45/46 | 48/49.5 | 56.5/61.5 | 40/44 | 48/48.5 | 45/48 |
| 264 psi load/66 psi load | | | | | | | |
| Izod impact strength, ft-lb/in | 0.23 | 0.28 | 0.39 | 0.82 | 0.31 | 0.42 | 0.38 |
| Tensile strength, psi | 8900 | 7200 | 8300 | 9000 | 5000 | 7500 | 6600 |
| Tensile modulus, psi | 498000 | 458000 | 485000 | 459000 | 347000 | 516000 | 439000 |
| Flexural strength, psi | 12000 | 13000 | 13000 | 14500 | 9800 | 16000 | 11000 |
| Flexural modulus, psi | 495000 | 465000 | 484000 | 455000 | 377000 | 506000 | 412000 |
| Tensile shear adhesion, psi | 1030 | 1280 | 1600 | 2770 | 2130 | 1470 | 2240 |
| Peel strength, pli | 3.2 | 3.4 | 3.2 | 3.5 | 4.0 | 2.6 | — |

[1]Cured 7 days ~25° C.

TABLE 4

Properties of Epoxy Resin Cured with Solutions of
RIM Urethane in JEFFAMINE Polyetheramines (Elevated Temperature Curing)

|  | 5409-68A | 5409-31A | 5409-35A | 5409-33A | 5409-36A | 5409-68C | 5409-51A |
|---|---|---|---|---|---|---|---|
| Formulation, pbw: | | | | | | | |
| Epoxy resin (WPE 188) | 100 | 100 | 100 | 100 | 100 | 100 | 100 |
| JEFFAMINE ® D-230 | 32 | — | — | — | — | — | — |
| D-230.RIM (83.3/16.7) | — | 42 | — | — | — | — | — |
| D-230.RIM (80/20) | — | — | 44 | — | — | — | — |
| D-230.RIM (70/30) | — | — | — | 55 | — | — | — |
| D-230.RIM (60/40) | — | — | — | — | 64 | — | — |
| JEFFAMINE T-403 | — | — | — | — | — | 42 | — |
| T-403.RIM (70/30) | — | — | — | — | — | — | 73 |
| Properties of cured ⅛" Castings[1] | | | | | | | |
| Shore D hardness, 0-10 sec | 88-86 | 73-72 | 78-76 | 76-74 | 74-72 | 83-82 | 75-73 |
| Ultimate elongation, % | 6.6 | 10.8 | 10.6 | 13 | 6.1 | 10.2 | 9.5 |
| Heat deflection temp., °C. | 80/83.5 | 77/81 | 74/78.5 | 69.5/74 | 63/70 | 78/82.5 | 70/76 |
| 264 psi load/66 psi load | | | | | | | |
| Izod impact strength, ft-lb/in | 0.92 | 1.26 | 1.07 | 0.99 | 1.03 | 0.68 | 0.82 |
| Tensile strength, psi | 9100 | 9300 | 8800 | 8600 | 8400 | 8800 | 8100 |
| Tensile modulus, psi | 427000 | 427000 | 402000 | 393000 | 404000 | 395000 | 363000 |
| Flexural strength, psi | 15000 | 16000 | 15000 | 14000 | 14000 | 14000 | 14000 |
| Flexural modulus, psi | 424000 | 426000 | 408000 | 390000 | 402000 | 402000 | 378000 |
| Tensile shear adhesion,[2] psi | 4030 | 4060 | 2160 | 4230 | 3930 | 3920 | 4250 |
| Peel strength,[2] pli | 2.3 | 2.3 | 2.3 | 11.6 | 17.7 | 3.5 | 16.9 |

[1]Cured 2 hrs 80° C., 3 hrs 125° C.
[2]Cured 2 hrs 110° C.,

As will be seen from Table 3, satisfactory results were obtained in all instances. There is a tendency for the extended systems to be somewhat softer and to have lower heat deflection temperatures than systems cured with amines alone. They are also more resistant to impact and are less brittle. These are advantageous properties which enhance the utility of the epoxy resins prepared from the extended amines of the present invention.

Note also that there was a steady increase in shear adhesion with the use of increasing amounts of RIM material in the extended amine.

Insofar as Table 4 is concerned, there was generally very little difference between the properties of the amine and the extended amine cured systems. The extended curing agents provided systems that were slightly softer but more flexible. Also the compositions of the present invention improved the peel strength of the cured systems.

EXAMPLE 2

In a second comparative experiment about 20 weight percent of the elastomeric polyurethane was incorporated into Jeffamine ED-900 and an epoxy resin was cured with this composition in combination with n-aminoethylpiperazine. Results were compared with a similar epoxy resin system cured with a mixture of N-aminoethylpiperazine and JEFFAMINE, ED-900.

The results of this experiment are set forth in Table 5.

TABLE 5

Comparison of Systems Cured with
JEFFAMINE ED-900 or ED-900.RIM Solution as Co-Curative

|  | 5409-89A | 5409-89B |
|---|---|---|
| Formulation, pbw | | |
| Epoxy Resin (WPE 188) | 100 | 100 |
| N—aminoethylpiperazine | 15.8 | 15.8 |
| JEFFAMINE ED-900 | 40 | — |
| ED-900.RIM (80/20) | — | 50 |
| Properties of cured ⅛" Castings[1] | | |
| Shore D hardness, 0-10 sec | 72-68 | 65-61 |
| Ultimate elongation, % | 67 | 38 |
| Heat deflection temp., °C. | 36.5/38.5 | 38/41 |
| 264 psi load/66 psi load | | |
| Izod impact strength, ft-lb/in | 2.88 | 1.68 |
| Tensile strength, psi | 3800 | 3300 |
| Tensile modulus, psi | 207000 | 141000 |
| Flexural strength, psi | 6400 | 5400 |

TABLE 6

Properties of Epoxy Resin Cured with Solutions of
RIM Urethane in Various Amines (Elevated Temperature Curing)

| Formulation, pbw: | 5409-37B | 5409-41A | 5409-68A | 5409-48A | 5409-68C | 5409-49A | 5409-68D | 5409-49B |
|---|---|---|---|---|---|---|---|---|
| Epoxy Resin (WPE 188) | 100 | 100 | 100 | 100 | 100 | 100 | 100 | 100 |
| N—aminoethylpiperazine (AEP) | 23 | — | — | — | — | — | — | — |
| AEP.RIM (70/30) | — | 26 | — | — | — | — | — | — |
| Triethylenetetramine (TETA) | — | — | 12 | — | — | — | — | — |
| TETA.RIM (80/20) | — | — | — | 15 | — | — | — | — |
| Isophoronediamine (IPDA) | — | — | — | — | 45 | — | 39 | — |
| IPDA.RIM (80/20) | — | — | — | — | — | 56 | — | 48.7 |
| Accelerator 399 | — | — | — | — | — | — | 5 | 5 |
| Glass transition temp., °C. | — | 108 | 105 | 132 | 93 | 114 | — | — |
| Pot life at 25° C. | | | | | | | | |
| Brookfield viscosity, cps, 25° C. | 1100 | 4190 | 1830 | 3410 | — | — | 1120 | 3670 |
| Gel time, min. (200 g mass) | 15.8 | 10.8 | 25.6 | 15.0 | — | — | 27.4 | 10.4 |
| Peak exothermic temp., °C. | 258.4 | 235.5 | 236.5 | 232.5 | — | — | 216.9 | 204.7 |
| Time to peak temp., min. | 19.5 | 14.0 | 30.0 | 18.0 | — | — | 30.8 | 14.3 |
| Properties of cured ⅛" Castings[1] | 5417-18A | | | | | | | |
| Shore D hardness, 0-10 sec | 89-87 | 75-73 | 83-81 | 82-80 | 76-74 | 77-75 | — | — |
| Ultimate elongation, % | 13.6 | 9.6 | 3.6 | 3.9 | 3.2 | 4.5 | — | — |
| Heat deflection temp., °C. | 104/110 | 114/119 | 101/110.5 | 107/114 | 84/90 | 90/94 | — | — |
| 264 psi load/66 psi load | | | | | | | | |
| Izod impact strength, ft-lb/in | 1.25 | 0.99 | 0.40 | 0.47 | 0.52 | 1.08 | — | — |
| Tensile strength, psi | 10000 | 10200 | 10200 | 9900 | 9200 | 10600 | — | — |
| Tensile modulus, psi | 351000 | 357000 | 407000 | 403000 | 439000 | 426000 | — | — |
| Flexural strength, psi | 15000 | 15000 | 17000 | 17000 | 17000 | 16800 | — | — |
| Flexural modulus, psi | 359000 | 355000 | 416000 | 408000 | 442000 | 422000 | — | — |
| Tensile shear adhesion,[2] psi | 3190 | 3840 | — | 2550 | 1560 | — | — | — |
| Peel strength,[2] pli | 3.4 | 4.8 | 2.6 | 2.9 | 2.0 | — | — | — |

[1]Cured 2 hrs 80° C., 3 hrs 125° C.
[2]Cured 2 hrs 110° C.

Comparison of Systems Cured with
JEFFAMINE ED-900 or ED-900.RIM Solution as Co-Curative

| | 5409-89A | 5409-89B |
|---|---|---|
| Flexural modulus, psi | 195000 | 146000 |

[1]Cured 2 hrs 80° C., 3 hrs 125° C.

Note from Table 5 that the heat deflection temperature was improved and that a softer cured epoxy resin was formed.

EXAMPLE 3

In this series of examples, three extended amines were prepared, one based upon aminoethylpiperazine, another based on triethylenetetramine (TETA), and a third based on isophoronediamine (IPDA). The solutions were prepared in the manner described above in Example 1. The results obtained when these extended amines were used to cure an epoxy resin are set forth in Table 6.

With reference to Table 6 it is seen that again the extended amines of the present invention provided slightly softer cured epoxy resins and that the products had higher heat deflection temperatures. It was noted that the pot life of the systems was decreased by several minutes with the use of the extended curing agents of the present invention.

EXAMPLE 4

Three of the amine-elastomeric polyurethane solutions (D-230.RIM 60/40, AEP.RIM 70/30 and TETA.-RIM 80/20). separate into two layers upon cooling. These solutions react with phenol and formaldehyde to form Mannich condensates. The details of the Mannich condensates that were prepared are set forth in Table 7.

TABLE 7

Mannich Condensate Prepared

| Run # | Amine | Wt % RIM | Mole Ratio Amine:Phenol:Formaldehyde |
|---|---|---|---|
| 5465-97 | N—aminoethylpiperazine | 30 | 1:1:1 |
| 5465-99 | JEFFAMINE D-230 | 40 | 2:1:1 |
| 5516-22 | JEFFAMINE D-230 | 50 | 4:1:1 |
| 5516-23 | N—aminoethylpiperazine | 30 | 2:1:1 |
| 5516-24 | Triethylenetetramine | 30 | 2:1:1 |

The resulting Mannich condensates were then used to cure epoxy resins with the results noted in Table 8.

TABLE 8

Properties of Epoxy Resin Cured with
Mannich Condensates of Amine.RIM Solutions

| | 5409-41 | 5516-37 | 5516-12 | 5409-36 | 5516-12 | 5516-33 | 5409-48 | 5516-35 |
|---|---|---|---|---|---|---|---|---|
| Formulation, pbw: | | | | | | | | |
| Epoxy Resin (WPE 188) | 100 | 100 | 100 | 100 | 100 | 100 | 100 | 100 |
| AEP.RIM (70/30) | 26 | — | — | — | — | — | — | — |

TABLE 8-continued

Properties of Epoxy Resin Cured with
Mannich Condensates of Amine.RIM Solutions

| | 5409-41 | 5516-37 | 5516-12 | 5409-36 | 5516-12 | 5516-33 | 5409-48 | 5516-35 |
|---|---|---|---|---|---|---|---|---|
| AEP.RIM (70/30) Mannich condensate (1:1:1) | — | 35 | — | — | — | — | — | — |
| AEP.RIM (70/30) Mannich condensate (2:1:1) | — | — | 37 | — | — | — | — | — |
| D-230.RIM (60/40) | — | — | — | 64 | — | — | — | — |
| D-230.RIM (60/40) Mannich condensate (2:1:1) | — | — | — | — | 48 | — | — | — |
| D-230.RIM (50/50) Mannich condensate (4:1:1) | — | — | — | — | — | 66 | — | — |
| TETA.RIM (80/20) | — | — | — | — | — | — | 15 | — |
| TETA.RIM (70/30) Mannich condensate (2:1:1) | — | — | — | — | — | — | — | 26 |
| Gel time, min. (100 g mass) | 10.8[1] | 4 | 9.5 | — | — | 4 | 15.0 | 6.5 |
| Peak exothermic temp., °C. | 235.5 | 41.6 | 131.8 | — | — | 34.2 | 232.5 | 137.6 |
| Time to peak temp., min. | 14.0 | 18.6 | 12.7 | — | — | 14 | 18.0 | 8.7 |
| Properties of cured ⅛" Castings[2] | | | | | | | | |
| Shore D hardness, 0–10 sec | 75–73 | 89–87 | 80–77 | 74–72 | 71–70 | 74–72 | 82–80 | 80–78 |
| Ultimate elongation, % | 9.6 | 6.3 | 5.2 | 6.1 | 6.2 | 2.7 | 3.9 | 5.8 |
| Heat deflection temp., °C. 264 psi load/66 psi load | 114/119 | 89/105 | 87/91 | 63/70 | 46/46 | 48/53 | 107/114 | 94/99 |
| Izod impact strength, ft-lb/in | 0.99 | 0.24 | 0.38 | 1.03 | 0.13 | 0.30 | 0.47 | 0.22 |
| Tensile strength, psi | 10200 | 10600 | 10100 | 8400 | 6500 | 7000 | 9900 | 11300 |
| Tensile modulus, psi | 357000 | 401000 | 379000 | 404000 | 442000 | 399000 | 403000 | 428000 |
| Flexural strength, psi | 15000 | 16900 | 15900 | 14000 | 9500 | 11000 | 17000 | 17100 |
| Flexural modulus, psi | 355000 | 41000 | 429000 | 402000 | 449000 | 429000 | 408000 | 443000 |
| Tensile shear adhesion,[3] psi | 3840 | 3360 | 4000 | 3930 | — | 2200 | 2550 | 2340 |
| Peel strength,[3] pli | 4.8 | 4.6 | 8.9 | 17.7 | — | 6.4 | 2.9 | 2.1 |

[1]200 g mass
[2]Cured 2 hrs 80° C., 3 hrs 125° C.
[3]Cured 2 hrs 110° C.
[4]Slow viscosity increase The results, as compared with Table 6 show that the use of the Mannich condensates resulted in cure systems having lower heat deflection temperatures and lower impact strengths.

EXAMPLE 5

A series of extended amines was prepared by the modified procedure of the present invention wherein the urethane elastomers were first dissolved in a solvent. There is no general rule that can be given as to the identity of the solvent to be used. However, a routine procedure such as the one described in this example may be used as a screening aid in selecting the solvent.

The procedure used for this example is to slowly add comminuted polyurethane elastomer to the solvent in a resin kettle and then heat to about 150° C. to dissolve the polyurethane in the solvent. Thus, comminuted polyurethane elastomer was added to dimethylformamide in a resin kettle and the mixture was heated to a temperature of about 150° C. to dissolve the urethane. The desired amine was then added to this solution and the dimethylformamide was stripped out by vacuum distillation. The solutions prepared by this method are set forth in Table 9.

TABLE 9

Amine.RIM/DMF Solutions Prepared

| Run # | Amine | Amount scrap RIM added, wt % | Appearance |
|---|---|---|---|
| 5409-40 | JEFFAMINE D-230 | 30 | Clear, light brown liquid |
| 5465-3 | JEFFAMINE T-403 | 20 | Opaque, white liquid |
| 5465-6 | JEFFAMINE D-400 | 20 | Opaque, white gel |
| 5465-10 | Aminoethylpiperazine | 30 | Cloudy, light yellow liquid |
| 5465-39 | Trimethylhexamethylene- | 20 | Cloudy, light yellow liquid |
| 5465-66 | Isophoronediamine | 20 | Clear, light |

TABLE 9-continued

Amine.RIM/DMF Solutions Prepared

| Run # | Amine | Amount scrap RIM added, wt % | Appearance |
|---|---|---|---|
| | | | yellow liquid |

However, when this procedure was used employing tetrahydrofuran, nonylphenol, acetone, methyl ethyl ketone, ethylene glycol monoethyl ether, ethylene glycol monobutyl ether and N-methylmorpholine-N-oxide, the polyurethane did not dissolve. Successful results were obtained, however, with dimethylformamide (as noted) and with diethylene glycol monobutyl ether and diethylene glycol monoethyl ether acetate.

Dimethylformamide was used as a solvent using the above-described procedure with a number of amines to prepare polyurethane-amine solutions for evaluation as epoxy curatives. The properties of the solutions are set forth in Table 10. Properties of an epoxy resin cured with these solutions at ambient temperatures are set forth in Tables 11 and 12.

Comparisons of the analytical test results for the solutions indicate that there was less polymer degradation by this technique than when the elastomeric polyurethane was directly dissolved in the amine as described in Example 1. Again, the extended amines provided good cured epoxy resin properties. As shown by Tables 11 and 12, the products were somewhat softer, had lower heat deflection temperatures and were generally more flexible than the unmodified systems. When the elevated temperature cures were employed, the extended systems of the present invention again had lower heat distortion temperature values and were softer with the exception of the systems based upon IPDA.RIM which were slightly harder than the system based on IPDA alone. The elevated curing experiments are tabulated in Tables 13 and 14.

TABLE 10

Typical Analytical Analyses of Amine.RIM/DMF Solutions

| Run # | 5409-68A | 5409-40 | 5409-68C | 5465-3 | | 5465-6 | 5465-18 | 5465-10 | 5465-38 | 5465-39 | 5465-28C | 5465-66 |
|---|---|---|---|---|---|---|---|---|---|---|---|---|
| Amine | D-230 | D-230 | T-403 | T-403 | D-400 | D-400 | AEP | AEP | TMD | TMD | IPDA | IPDA |
| Wt % RIM | 0 | 30 | 0 | 20 | 0 | 20 | 0 | 30 | 0 | 20 | 0 | 20 |
| Total acetylatables, meq/g | 8.75 | 6.54 | 6.75 | 5.52 | 5.17 | 4.08 | 15.68 | 11.20 | 12.75 | 10.36 | 11.74 | 9.75 |
| Total amine, meq/g | 8.45 | 5.68 | 6.45 | 5.32 | 4.99 | 3.38 | 23.50 | 15.13 | 12.64 | 10.21 | 11.89 | 9.43 |
| 1° Amine, meq/g | 8.30 | 5.57 | 6.16 | 4.85 | 4.93 | 3.32 | 7.5 | 4.3 | 12.62 | 10.20 | 11.87 | 9.26 |
| 2° Amine, meq/g | — | — | — | — | — | — | 7.03 | 5.36 | 0 | 0 | 0.01 | 0.17 |
| 3° Amine, meq/g | — | — | — | — | — | — | 8.97 | 5.47 | 0.02 | 0.01 | 0.01 | 0.004 |
| Specific gravity 20/20° C. | 0.9480 | 1.0206 | 0.9812 | 1.0185 | 0.9702 | 1.0095 | 0.9879 | 0.9060 | 0.8729 | 0.9218 | 0.9261 | 0.9702 |
| Brookfield visc., cps, 25° C. | — | 500 | — | 13300 | — | 22500 | 20 | 800 | 6.0 | 83 | 23 | 360 |
| Water, wt % | 0.10 | 0.04 | 0.08 | 0.02 | 0.13 | 0.02 | 0.57 | 0.21 | 0.86 | 0.18 | 0.17 | 0.10 |

TABLE 11

Properties of Epoxy Resin Cured with Solutions of RIM Urethane in JEFFAMINE Polyetheramines (Ambient Curing)

| | 5409-68B | 5409-40B | 5409-68D | 5465-3B | | 5465-6B |
|---|---|---|---|---|---|---|
| Formulation, pbw: | | | | | | |
| Epoxy Resin (WPE 188) | 100 | 100 | 100 | 100 | 100 | 100 |
| JEFFAMINE D-230 | 26.4 | — | — | — | — | — |
| D-230.RIM/DMF (70/30) | — | 39.5 | — | — | — | — |
| JEFFAMINE T-403 | — | — | 36.4 | — | — | — |
| T-403.RIM/DMF (80/20) | — | — | — | 44.5 | — | — |
| JEFFAMINE D-400 | — | — | — | — | 45.5 | — |
| D-400.RIM/DMF (80/20) | — | — | — | — | — | 57.3 |
| Accelerator 399 | 5 | 5 | 5 | 5 | 5 | 5 |
| Gel time, min. (100 g mass) | 52.0[1] | 29.3[1] | 27.6[2] | 24.4[2] | 48.1[2] | 37.9[2] |
| Peak exothermic temp., °C. | 189.5 | 181.1 | 94.3 | 110.2 | 80.9 | 87.3 |
| Properties of cured ⅛" Castings[3] | | | | | | |
| Shore D hardness, 0-10 sec | 90-89 | 83-82 | 90-88 | 78-76 | 71-67 | 65-59 |
| Ultimate elongation, % | 2.1 | 4.4 | 1.7 | 5.0 | 20.8 | 100.0 |
| Heat deflection temp., °C. 264 psi load/66 psi load | 46/48 | 45/45.5 | 48/48.5 | 48.5/52 | 35/37.5 | 26/28 |
| Izod impact strength, ft-lb/in | 0.23 | 0.31 | 0.42 | 0.60 | 1.45 | 1.97 |
| Tensile strength, psi | 8900 | 7000 | 7500 | 4600 | 5600 | 3000 |
| Tensile modulus, psi | 498000 | 442000 | 516000 | 448000 | 314000 | 179000 |
| Flexural strength, psi | 12000 | 13000 | 16000 | 15000 | 10300 | 4100 |
| Flexural modulus, psi | 495000 | 441000 | 506000 | 457000 | 322000 | 155000 |
| Tensile shear adhesion, psi | 1030 | 1200 | 1470 | 1380 | 2250 | 2380 |
| Peel strength, pli | 3.2 | 3.1 | 2.6 | 2.8 | 2.6 | 11.3 |

[1] 200 g mass
[2] Test run at 50° C.
[3] Cured 7 days ~25° C.

TABLE 12

Properties of Epoxy Resin Cured with Solutions of RIM Urethane in Various Amines (Ambient Curing)

| | 5465-58C | 5464-10B | 5465-38B | 5465-39B | 5465-89A | 5465-66B |
|---|---|---|---|---|---|---|
| Formulation, pbw: | | | | | | |
| Epoxy Resin (WPE 188) | 100 | 100 | 100 | 100 | 100 | 100 |
| N—aminoethylpiperazine (AEP) | 23 | — | — | — | — | — |
| AEP.RIM/DMF (70/30) | — | 26 | — | — | — | — |
| Trimethylhexamethylenediamine (TMD) | — | — | 18.8 | — | — | — |
| TMD.RIM/DMF (80/20) | — | — | — | 22.2 | — | — |
| Isophoronediamine (IPDA) | — | — | — | — | 38.5 | — |
| IPDA.RIM/DMF (80/20) | — | — | — | — | — | 47.9 |
| Accelerator 399 | — | — | 5 | 5 | 5 | 5 |
| Pot life at 25° C. | | | | | | |
| Gel time, min. (100 g mass) | 17.8 | 6.8 | 10.9 | 8.8 | 35.9 | 14.1 |
| Peak exothermic temp., °C. | 171.1 | 142.7 | 146.0 | 142.4 | 128.5 | 127.5 |

*Accelerator 399 is described in U.S. Pat. No. 4,195,143 and is a mixture of primary, secondary and tertiary amines having an equivalent weight of 65.

TABLE 13

Properties of Epoxy Resin Cured with Solutions of RIM Urethane in JEFFAMINE Polyetheramines (Elevated Temperature Curing)

| | 5409-68A | 5409-40A | 5409-68C | 5465-3A | 5465-37A | 5465-6A |
|---|---|---|---|---|---|---|
| Formulation, pbw: | | | | | | |
| Epoxy Resin (WPE 188) | 100 | 100 | 100 | 100 | 100 | 100 |

TABLE 13-continued

Properties of Epoxy Resin Cured with Solutions of RIM Urethane in JEFFAMINE Polyetheramines (Elevated Temperature Curing)

|  | 5409-68A | 5409-40A | 5409-68C | 5465-3A | 5465-37A | 5465-6A |
|---|---|---|---|---|---|---|
| JEFFAMINE D-230 | 32 | — | — | — | — | — |
| D-230.RIM/DMF (70/30) | — | 46 | — | — | — | — |
| JEFFAMINE T-403 | — | — | 42 | — | — | — |
| T-403.RIM/DMF (80/20) | — | — | — | 52 | — | — |
| JEFFAMINE D-400 | — | — | — | — | 53.2 | — |
| D-400.RIM/DMF (80/20) | — | — | — | — | — | 67 |
| Properties of cured ⅛" Castings[1] | | | | | | |
| Shore D hardness, 0-10 sec | 88-86 | 75-73 | 83-82 | 78-75 | 76-74 | 73-67 |
| Ultimate elongation, % | 6.6 | 6.6 | 10.2 | 12.3 | 3.3 | 30.4 |
| Heat deflection temp., °C. 264 psi load/66 psi load | 80/83.5 | 73/79 | 78/82.5 | 70/78 | 46/47 | 33/36 |
| Izod impact strength, ft-lb/in | 0.92 | 0.90 | 0.68 | 0.82 | 2.26 | 1.91 |
| Tensile strength, psi | 9100 | 9300 | 8800 | 8100 | 7500 | 3100 |
| Tensile modulus, psi | 427000 | 407000 | 395000 | 368000 | 401000 | 192000 |
| Flexural strength, psi | 15000 | 16000 | 14000 | 14000 | 12600 | 7200 |
| Flexural modulus, psi | 424000 | 399000 | 402000 | 381000 | 434000 | 264000 |
| Tensile shear adhesion[2], psi | 4060 | 4540 | 3920 | 3660 | 3060 | 2950 |
| Peel strength[2], pli | 2.3 | 9.9 | 3.5 | 5.6 | 2.9 | 33.0 |

[1]Cured 2 hrs 80° C., 3 hrs 125° C.
[2]Cured 2 hrs 110° C.

TABLE 14

Properties of Epoxy Resin Cured with Solutions of RIM Urethane in Various Amines (Elevated Temperature Curing)

|  | 5417-18A | 5465-10A | 5409-38A | 5465-39A | 5409-49A | 5465-66A |
|---|---|---|---|---|---|---|
| Formulation, pbw: | | | | | | |
| Epoxy Resin (WPE 188) | 100 | 100 | 100 | 100 | 100 | 100 |
| N—aminoethylpiperazine (AEP) | 23 | — | — | — | — | — |
| AEP.RIM/DMF (70/30) | — | 26 | — | — | — | — |
| Trimethylhexamethylenediamine (TMD) | — | — | 22 | — | — | — |
| TMD.RIM/DMF (80/20) | — | — | — | 26 | — | — |
| Isophoronediamine (IPDA) | — | — | — | — | 45 | — |
| IPDA.RIM/DMF (80/20) | — | — | — | — | — | 56 |
| Properties of cured ⅛" Castings[1] | | | | | | |
| Shore D hardness, 0-10 sec | 89-87 | 76-74 | 81-79 | 78-76 | 76-74 | 80-78 |
| Ultimate elongation, % | 13.6 | 12.7 | 10.0 | 10.4 | 3.2 | 2.6 |
| Heat deflection temp., °C. 264 psi load/66 psi load | 104/110 | 99.5/107 | 98/103 | 94/103 | 84/90 | 82/88 |
| Izod impact strength, ft-lb/in | 1.25 | 0.79 | 0.68 | 0.67 | 0.52 | 1.14 |
| Tensile strength, psi | 10000 | 9300 | 9000 | 9300 | 9200 | 8500 |
| Tensile modulus, psi | 351000 | 349000 | 324000 | 347000 | 439000 | 394000 |
| Flexural strength, psi | 15000 | 14000 | 14000 | 14000 | 17000 | 14000 |
| Flexural modulus, psi | 359000 | 359000 | 358000 | 371000 | 442000 | 424000 |
| Tensile shear adhesion[2], psi | 3190 | 3740 | 2830 | 3550 | 1560 | 4190 |
| Peel strength[2], pli | 3.4 | 6.0 | 2.1 | 3.6 | 2.0 | 3.6 |

[1]Cured 2 hrs 80° C., 3 hrs 125° C.
[2]Cured 2 hrs 110° C.

As will be seen by the foregoing specific examples, the extended amine curing agents of the present invention provide cured epoxy systems that are suitable for industrial applications.

It will be understood that the foregoing examples are given by way of illustration only and not by way of limitation and that the scope of the present invention is defined solely by the appended claims.

What is claimed is:

1. A composition for use in the curing of a 1,2-epoxy resin consisting essentially of a solution of a cured elastomeric polyurethane formed by reaction injection molding in a 1,2-epoxy-interactive polyether polyamine or a Mannich condensate of said polyether polyamine with a phenol and formaldehyde, said polyether polyamine having a formula as follows:

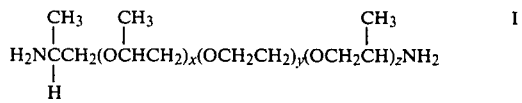

wherein x+z=about 2 to 10 and y equals about 1 to 50; or

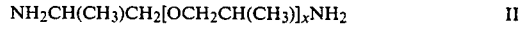

wherein x is a number having a value of about 2 to 40; or

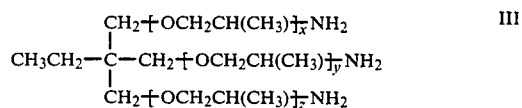

wherein x, y and z represent numbers in the range of about 1 to 15 and the sum of x, y and z is from about 3 to 50.

2. A composition as in claim 1 wherein the polyether polyamine has the formula:

NH₂CH(CH₃)CH₂[OCH₂CH(CH₃)]ₓNH₂ wherein x is a number having a value of about 2 to 40.

3. A composition as in claim 2 wherein x has a value of about 2.6.

4. A composition as in claim 2 wherein x has a value of about 5.6.

5. A composition as in claim 2 wherein x has a value of about 33.

6. A composition as in claim 1 wherein the polyether polyamine has the formula:

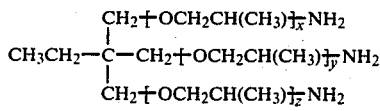

wherein x, y and z represent numbers in the range of about 1 to 15 and the sum of x, y and z is from about 3 to 50.

7. A composition as in claim 6 wherein the sum of x plus y plus z equals about 5.3.

8. A composition for use in the curing of epoxy resins comprising a major amount of a Mannich condensate of a 1,2-epoxy-interactive polyether polyamine curing agent having dissolved therein a minor amount of a cured solid elastomeric polyurethane formed by reaction injection molding.

9. A composition as in claim 8 wherein the Mannich condensate is a Mannich condensate of about 1 mol of formaldehyde and about 1 mol of phenol with about 1 to 4 mols of N-aminoethylpiperazine.

10. A composition as in claim 8 wherein the Mannich condensate is a Mannich condensate of about 1 mol of formaldehyde and about 1 mol of phenol with about 1-4 mols of a polyamine having the formula:

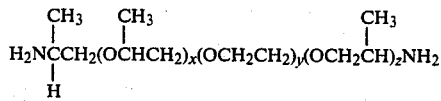

wherein x+z=about 2 to 10 and y equals about 1 to 50.

11. A composition as in claim 8 wherein the Mannich condensate is a Mannich condensate of about 1 mol of formaldehyde and about 1 mol of phenol with about 1 to 4 mols of a polyamine having the formula:

NH₂CH(CH₃)CH₂[OCH₂CH(CH₃)]ₓNH₂ wherein x is a number having a value of about 2 to 40.

12. A method for the preparation of a composition useful in the curing of a 1,2-epoxy resin which comprises the steps of:
a. heating a 1,2-epoxy-interactive polyether polyamine curing agent at a temperature of 100 to about 200 degrees C. and
b. maintaining said polyether polyamine at said temperature while dissolving therein a soluble amount of a comminuted particles of a cured solid elastomeric polyurethane;

said polyether polyamine having a formula as follows:

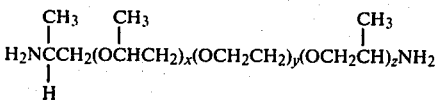

wherein x+z=about 2 to 10 and y equals about 1 to 50;

NH₂CH(CH₃)CH₂[OCH₂CH(CH₃)]ₓNH₂ wherein x is a number having a value of about 2 to 40; or

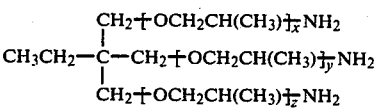

wherein x, y and z represent numbers in the range of about 1–15 and wherein x+y+z equals about 3 to 50.

13. A method as in claim 12 wherein the cured polyurethane is a polyurethane prepared by reaction injection molding and wherein the polyether polyamine is a polyether polyamine having the formula:

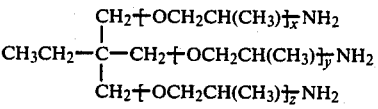

wherein x, y and z represent numbers in the range of about 1–15 and wherein x+y+z equals about 3 to 50.

14. A method for the preparation of a liquid polyether polyamine curing composition useful in the curing of a 1,2-epoxy resin from a 1,2-epoxy-interactive liquid polyether polyamine curing agent and a cured solid elastomeric polyurethane prepared by reaction injection molding which comprises the steps of:
a. heating a polar organic solvent in which said cured elastomeric polyurethane is soluble at a temperature of about 100 to about 200 degrees C.,
b. adding comminuted particles of said cured elastomeric polyurethane to said polar organic solvent within said temperature range to dissolve said solid elastomeric polyurethane in said polar organic solvent,
c. adding to said thus-prepared solution an amount of a 1,2-epoxy-interactive polyether polyamine curing agent greater in weight than the weight of said elastomeric polyurethane at said temperature and
d. stripping said polar organic solvent from said solution to thereby provide said liquid polyamine curing agent composition;
said polyether polyamine having a formula as follows:

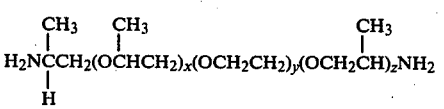

wherein x+z=about 2 to 10 and y equals about 1 to 50;

NH₂CH(CH₃)CH₂[OCH₂CH(CH₃)]ₓNH₂            II wherein x is a number having a value of about 2 to 40; or

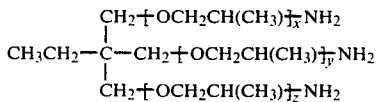  III wherein x, y and z represent numbers in the range of about 1–15 and wherein $x+y+z$ equals about 3 to 50.

15. A method as in claim 14 wherein the polar organic solvent is dimethylformamide and the liquid polyether polyamine curing agent has the formula:

$$NH_2CH(CH_3)CH_2[OCH_2CH(CH_3)]_xNH_2$$

wherein x is a number having a value of about 2–40.

16. A method as in claim 15 wherein x has a value of about 2.6.

17. A method as in claim 15 wherein x has a value of about 5.6.

18. A method as in claim 14 wherein the polar organic solvent is dimethylformamide and the polyether polyamine curing agent has the formula:

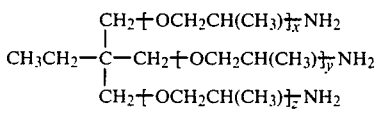

wherein x, y and z represent numbers in the range of about 1 to 15 and $x+y+z$ equals about 3 to 50.

19. A method as in claim 18 wherein $x+y+z=$ about 5.3.

20. A method for the preparation of a Mannich condensate curing composition useful in the curing of a 1,2-epoxy resin from a 1,2-epoxy-interactive polyether polyamine curing agent and a cured solid elastomeric polyurethane prepared by reaction injection molding which comprises the steps of:
 a. heating said polyether polyamine curing agent at a temperature of about 100 to 200 degrees C.,
 b. maintaining said polyether polyamine at said temperature while adding thereto a soluble amount of said solid elastomeric polyurethane in comminuted form, to dissolve said cured polyurethane in said polyether polyamine, and
 c. adding formaldehyde and a phenol compound to the solution with agitation to form a Mannich condensate of said polyether polyamine, said formaldehyde and said phenol compound and to thereby provide said Mannich condensate curing composition;

said polyether polyamine having a formula as follows:

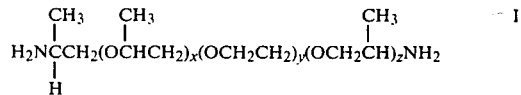  I wherein $x+z=$ about 2 to 10 and y equals about 1 to 50;

$$NH_2CH(CH_3)CH_2[OCH_2CH(CH_3)]_xNH_2 \quad II$$

wherein x is a number having a value of about 2 to 40; or

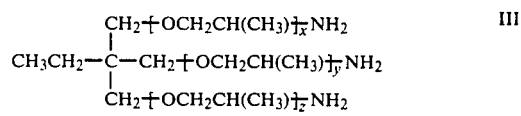  III wherein x, y and z represent numbers in the range of about 1–15 and wherein $x+y+z$ equals about 3 to 50.

21. A method as in claim 20 wherein phenol is used, wherein said phenol, said formaldehyde and said polyether polyamine are used in the mol ratios of 1 mol of phenol and about 1 to 4 mols of said polyether polyamine per mol of formaldehyde and wherein said polyether polyamine is a polyamine having the formula:

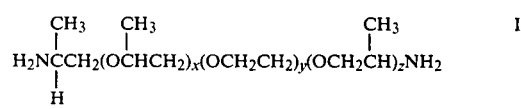  I wherein $x+z=$ about 2 to 10 and y equals about 1 to 50.

22. A method as in claim 20 wherein phenol is used, wherein said phenol, said formaldehyde and said polyether polyamine are used in the mol ratios of about 1 mol of phenol and about 1 to 4 mols of polyamine per mol of formaldehyde and wherein the polyether polyamine is a polyether polyamine having the formula:

$$NH_2CH(CH_3)CH_2[OCH_2CH(CH_3)]_xNH_2$$

ps wherein x is a number having a value of about 2 to 40.

* * * * *